US012578015B1

(12) United States Patent
Delp et al.

(10) Patent No.: US 12,578,015 B1
(45) Date of Patent: Mar. 17, 2026

(54) DYNAMIC TRANSMISSION DISENGAGEMENT FOR A VEHICLE BASED ON CURRENT CONDITIONS IN A WORK CYCLE

(71) Applicant: Deere & Company, Moline, IL (US)

(72) Inventors: Ethan H. Delp, Dubuque, IA (US); Jake J. Baker, Peosta, IA (US); John B. Luedtke, Dubuque, IA (US); David F. Rindfleisch, Dubuque, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 19/179,079

(22) Filed: Apr. 15, 2025

(51) Int. Cl.
| | |
|---|---|
| *F16H 61/16* | (2006.01) |
| *B60P 1/04* | (2006.01) |
| *F16H 59/40* | (2006.01) |
| *F16H 59/50* | (2006.01) |
| *F16H 59/54* | (2006.01) |
| *F16H 59/56* | (2006.01) |
| *F16H 59/60* | (2006.01) |
| *F16H 61/30* | (2006.01) |
| *H04W 4/48* | (2018.01) |
| *F16H 59/68* | (2006.01) |

(52) U.S. Cl.
CPC .............. *F16H 61/16* (2013.01); *B60P 1/04* (2013.01); *F16H 59/40* (2013.01); *F16H 59/50* (2013.01); *F16H 59/54* (2013.01); *F16H 59/56* (2013.01); *F16H 59/60* (2013.01); *F16H 61/30* (2013.01); *H04W 4/48* (2018.02); *F16H 2059/6807* (2013.01); *F16H 2059/6823* (2013.01)

(58) Field of Classification Search
CPC .......... F16H 61/16; F16H 61/30; F16H 59/40; F16H 59/50; F16H 59/54; F16H 59/56; F16H 59/60; F16H 2059/6807; F16H 2059/6823; H04W 4/48; B60P 1/04
See application file for complete search history.

(56) References Cited

U.S. PATENT DOCUMENTS

| | | | |
|---|---|---|---|
| 2015/0112560 A1* | 4/2015 | Bremner | F16H 61/0213 701/60 |
| 2020/0340576 A1* | 10/2020 | Schwarz | F16H 59/56 |
| 2023/0184330 A1* | 6/2023 | Fiesel | F16H 61/20 701/60 |

* cited by examiner

*Primary Examiner* — Edwin A Young
(74) *Attorney, Agent, or Firm* — Gary L. Montle; Lucian Wayne Beavers; Patterson Intellectual Property Law, PC

(57) ABSTRACT

The present disclosure relates to a computer-implemented method for selectively enabling transmission state disengagement in a transport vehicle equipped with a transmission operable among multiple states. The method involves receiving signals from various sources: a propulsion control unit indicating powertrain speed, perception sensors providing the vehicle's position relative to a work area, or a signal indicating the hydraulic control state. Based on these inputs, the method dynamically estimates the vehicle's work state, distinguishing between traveling and working modes. A transmission state control signal is conditionally generated according to the estimated work state, enabling transmission state disengagement exclusively during the working mode. This approach ensures efficient operation by adapting the transmission state to the vehicle's current operational context, enhancing performance and safety in work environments.

20 Claims, 3 Drawing Sheets

100

104

108

112

200

106

106

106

102

DYNAMIC TRANSMISSION DISENGAGEMENT FOR A VEHICLE BASED ON CURRENT CONDITIONS IN A WORK CYCLE

FIELD OF THE DISCLOSURE

The present disclosure relates generally to transport vehicles such as for example dump trucks used to haul material to and from work areas associated with construction and forestry machines, and more particularly to methods and systems for controlling selective engagement of transmissions in transport vehicles based on current conditions in a work cycle.

BACKGROUND

In the field of transport vehicles, particularly those used in industrial and construction settings, the management of transmission states is crucial for optimizing performance. In typical circumstances, an operator (e.g., driver) will engage the service brake at various points in transit and leave the vehicle in gear, rather than shifting the transmission to a neutral state. This will often result in an excessive amount of time with the vehicle in gear, with the foot of the operator on the service brake, and accordingly the vehicle engine driving against the torque converter of the transmission unit. It has been demonstrated that this may for example undesirably increase the load applied on the engine by about twenty percent.

BRIEF SUMMARY

The current disclosure provides an enhancement to conventional systems, at least in part by introducing a novel method and system for automatically and conditionally controlling a transmission state of a transport vehicle, thereby and advantageously providing fuel consumption savings, and preferably without requiring any manual input from the operator.

A conditional transmission disengagement feature as further disclosed herein may be advantageous for any number or situations that are not directly related to a dynamic working environment for the respective load-transporting element. One illustrative example includes the common situation wherein a transport vehicle approaches a work machine having a loading tool (e.g., excavator, loader) while it is already loading another transport vehicle, and therefore has to wait until that current operation completed before moving forward to itself be loaded.

Another illustrative example includes wherein the transport vehicle approaches a dumping area (e.g., including a hopper, dozer, etc.) but is waiting for another transport vehicle to complete its respective dumping operation. This may for example be the case in a narrow area or in a scenario where a transport vehicle must reverse up a slope before dumping.

As alluded to above, such situations may typically lead to an increased load on the engine and therefore a higher fuel burn during "idle" time. This results in an estimated 5-8% increase in fuel burn during idle time, which accounts for ~40% of total operation on articulated dump trucks. The conditional feature as disclosed herein for dynamic shifting of the transmission to a neutral state, preferably without requiring action or even knowledge of the feature implementation by an operator, will recognize the appropriate conditions for which to shift from forward to neutral to eliminate this excessive fuel burn.

Conversely, situations have also been identified wherein the conditional feature would otherwise be activated based on analogous conditions, but should not be enabled. One such illustrative example includes wherein a transport vehicle slows down and stops as it pulls into an unloading area (e.g., the operator foot stays on the service brake while in gear) and further pulls back on the bin lever to dump the load (or for example where an autoload feature is implemented). In such a context, the transport vehicle is in an active working mode and the conditional feature as disclosed herein should not be enabled or activated.

In one particular and exemplary embodiment, a computer-implemented method is provided herein for automatically and conditionally implementing a transmission state control feature for a transport vehicle comprising a transmission unit, a service brake, a load-transporting element, and a controller. The method includes automatically ascertaining, via the controller, a transit state or a working state of the transport vehicle based on input signals from one or more vehicle sensors and corresponding to a first set of one or more operating parameters, wherein conditions for each of the one or more operating parameters in the first set are determined relative to specified values and/or thresholds, wherein a transit state is determined in association with each respective condition being satisfied for each of the one or more operating parameters in the first set, wherein at least one of the first set of one or more operating parameters is associated with a position of the load-transporting element, and wherein the transmission state control feature is disabled in an ascertained working state. The method further includes determining, via the controller and upon ascertaining the transit state, conditions for each of a second set of one or more operating parameters relative to specified values and/or thresholds, wherein the transmission state control feature is activated upon each respective condition being satisfied for each of the one or more operating parameters in the second set, wherein at least one of the second set of one or more operating parameters is associated with application of the service brake. Upon activation of the transmission state control feature, an output signal is automatically generated for commanding the transmission unit to a neutral state, wherein an associated clutch is disengaged and further comprising an amount of hydraulic fluid pumped thereto and defining a prefilled state. Upon further determining that each respective condition is no longer satisfied for each of the one or more operating parameters in the second set, an output signal is automatically generated for commanding the transmission unit to a non-neutral state.

In an exemplary aspect according to the above-referenced embodiment and optionally other aspects as described herein, application of the service brake may be determined based on a threshold level of engagement of the service brake, and/or based on detected commands for application of the service brake.

In another exemplary aspect according to the above-referenced embodiment and optionally other aspects as described herein, the at least one of the first set of one or more operating parameters associated with the position of the load-transporting element may comprise a determined tilt angle of the load-transporting element relative to a frame of the transport vehicle, wherein for activation of the transmission state control feature a condition must be satisfied based on the tilt angle being determined as below a corresponding threshold value.

In another exemplary aspect according to the above-referenced embodiment and optionally other aspects as described herein, the at least one of the first set of one or more operating parameters associated with the position of the load-transporting element may comprise a detected command for raising the load-transporting element relative to a frame of the transport vehicle, wherein for activation of the transmission state control feature a condition must be satisfied based on no commands being provided for raising of the load-transporting element.

In another exemplary aspect according to the above-referenced embodiment and optionally other aspects as described herein, signals corresponding to an output shaft speed associated with the transmission unit may be received as one of the first and/or second sets of one or more operating parameters, wherein for activation of the transmission state control feature a condition must be satisfied based on a first threshold for the output shaft speed and further based on a second threshold for a duration of time being below the output shaft speed.

In another exemplary aspect according to the above-referenced embodiment and optionally other aspects as described herein, signals corresponding to a parking brake associated with the transport vehicle may be received as one of the first and/or second sets of one or more operating parameters, wherein for activation of the transmission state control feature a condition must be satisfied based on the parking brake being disengaged.

In another exemplary aspect according to the above-referenced embodiment and optionally other aspects as described herein, signals corresponding to a pitch of the transport vehicle may be received as one of the first and/or second sets of one or more operating parameters, wherein for activation of the transmission state control feature a condition must be satisfied based on the pitch being determined as below a corresponding threshold value.

In another exemplary aspect according to the above-referenced embodiment and optionally other aspects as described herein, signals corresponding to a rate of release for a pedal associated with the service brake may be received as one of the first and/or second sets of one or more operating parameters, wherein for activation of the transmission state control feature a condition must be satisfied based on the rate of release being determined as below a corresponding threshold value.

In another exemplary aspect according to the above-referenced embodiment and optionally other aspects as described herein, signals corresponding to an execution time for disengagement of the associated clutch pursuant to commanding of the transmission unit to the neutral state may be received as one of the first and/or second sets of one or more operating parameters, wherein for activation of the transmission state control feature a condition must be satisfied based on the execution time being determined as below a corresponding threshold value.

In another exemplary aspect according to the above-referenced embodiment and optionally other aspects as described herein, signals may be received corresponding to an execution time for engagement of the associated clutch pursuant to commanding of the transmission unit from the neutral state to the non-neutral state, wherein for subsequent activation of the transmission state control feature a condition must be satisfied based on an expected execution time for engagement of the associated clutch being determined as below a corresponding threshold value.

In another embodiment, a transport vehicle as disclosed herein may include a transmission unit, a service brake, a load-transporting element, one or more vehicle sensors configured to generate output signals corresponding to one or more operating parameters, and a controller configured to direct the performance of steps in a method according to the above-referenced method embodiment and optionally one or more of the exemplary aspects thereof.

In another embodiment, a computer system may include one or more processors, for example in the form of a server system, user computing devices, and/or a controller residing on a work vehicle, and configured to direct the performance of steps in a method according to the above-referenced method embodiment and optionally one or more of the exemplary aspects thereof.

Numerous objects, features, and advantages of the embodiments set forth herein will be readily apparent to those skilled in the art upon reading of the following disclosure when taken in conjunction with the accompanying drawings.

DETAILED DESCRIPTION

Figure 1:
FIG. 1 is a representative side view of an embodiment of a transport vehicle according to the present disclosure.
Figure 2:
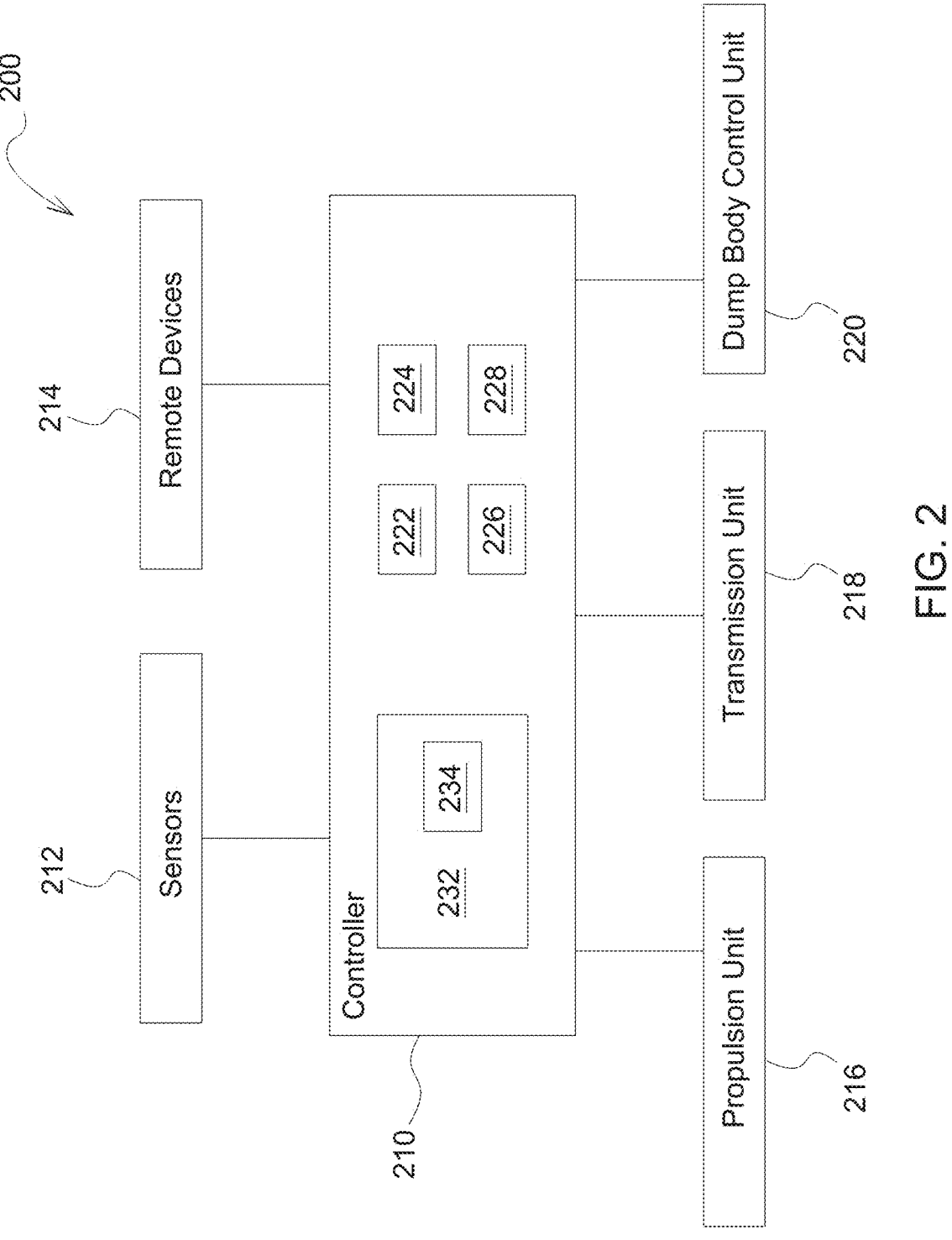
FIG. 2 is a block diagram representing an embodiment of a control system for a transport vehicle according to the present disclosure.
Figure 3:
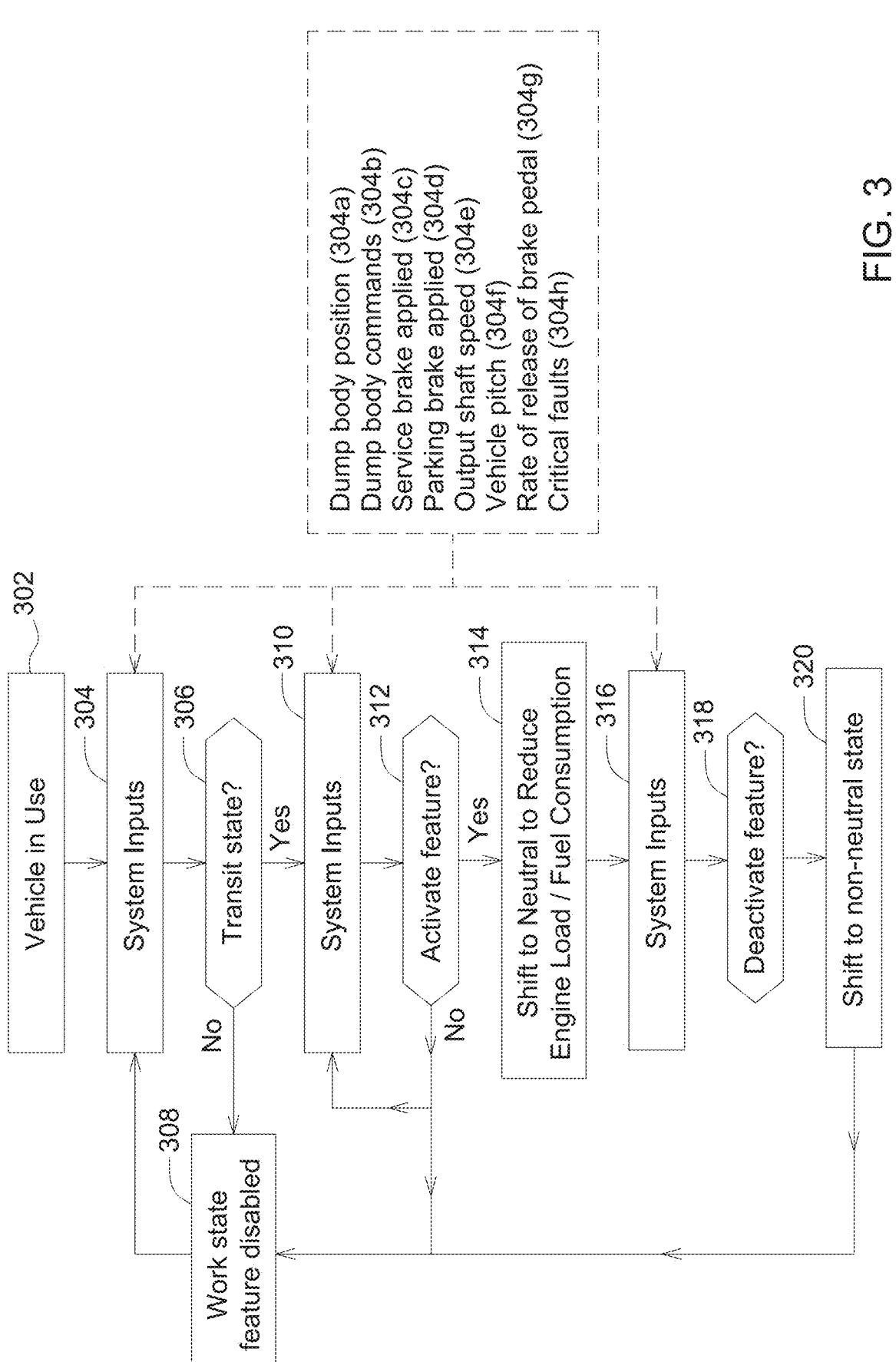
FIG. 3 is a flowchart representing an embodiment of a method according to the present disclosure.

Referring now to FIGS. 1-3, various embodiments may now be described of a system and method for selectively enabling a transmission state disengagement for a transport vehicle comprising a transmission operable among a plurality of transmission states.

FIG. 1 depicts an embodiment of a transport vehicle 100 according to an aspect of the present disclosure. In some aspects, the transport vehicle 100 may be provided as an articulated dump truck as depicted in FIG. 1. Other examples of transport vehicles are contemplated, including but not limited to conventional rigid dump trucks, off-highway mining trucks, articulated haulers, and autonomous or remotely-operated transport vehicles. The transport vehicle 100 may include a plurality of wheels 106 or equivalent ground-engaging units and associated axles, and a frame 102 supporting a load-transporting element 104 (such as a dump body as depicted) having for example a loading surface at the bottom of an interior area surrounded by sidewalls, and a top edge at least part of which may typically be in parallel with the ground surface. In some aspects, the load-transporting element 104 may be provided as a container or bin in the transport vehicle 100, including a hinged and tiltable dump body. In some aspects, the load-transporting element 104 may be provided as a modular or removable container removably coupled with the transport vehicle 100. Those of skill in the art will appreciate the load-transporting element 104 may be provided as any type of load-carrying body capable of receiving and carrying material, and controllably dumping the material loaded therein.

The transport vehicle 100 may further include a hydraulic actuator 108, which may be coupled between the frame 102 and the load-transporting element 104 and configured to selectively extend and/or raise/pivot the load-transporting element 104 relative to the frame 102 and to a dumping position (as depicted in FIG. 1), and to retract and/or lower/pivot the loading container from the dumping position to a travel and loading position. In an exemplary aspect, the hydraulic actuator 108 may include a piston-cylinder unit. The hydraulic actuator 108 may also include tandem or multi-stage actuators. In some aspects (not shown), a transport vehicle 100 may further include an ejection system to scrape or otherwise remove carryback material from the surface of the load-transporting element 104.

As described further herein, disclosures related to the load-transporting element 104 generally may apply equally to any alternative arrangement as conventionally known in the art for the load-transporting element 104 of the transport vehicle 100 depicted herein unless specifically denoted otherwise.

An operator portion 112 of the transport vehicle 100, exemplified as an operator's cab, may be located on the frame 102, wherein directions with regard to the transport vehicle 100 may be referred to from the perspective of an operator seated within the operator portion 112; the left of the transport vehicle is to the left of such an operator, the right of the transport vehicle is to the right of such an operator, a front-end portion (or fore) of the transport vehicle is the direction such an operator faces, a rear-end portion (or aft) of the transport vehicle is behind such an operator, a top of the transport vehicle is above such an operator, and a bottom of the transport vehicle below such an operator.

Referring in addition now to a control system 200 as depicted in FIG. 2, the transport vehicle 100 may further include a powertrain system for generating power to the transport vehicle 100 and managing distribution and transmission of power to drive the transport vehicle 100. The powertrain system includes a propulsion unit 116 (e.g., including an engine) to provide power to the transport vehicle 100, a transmission unit 118 to adjust power and torque through or in association with various transmission states, and additional drive components to deliver power to at least the wheels of the transport vehicle 100. The transport vehicle may further include a dump body control unit 120 for driving the hydraulic actuator 108 as described above.

The transmission 118 of the transport vehicle 100 may be operable among a plurality of transmission states by operation of components associated with the transmission unit 118, including by example clutch packs, torque converters, and other hydraulic systems operable to transition among the plurality of transmission states. In some aspects, the plurality of transmission states may include at least one of a non-neutral state (i.e., transmission state engagement for enabling forward or reverse propulsion), a neutral state (i.e., a transmission state disengagement), and transitional states between the engaged and disengaged state and among the engaged states. In one aspect of the non-neutral transmission state, the transmission 118 connects the propulsion unit 116 to the drivetrain via fully pressurized clutch packs or a torque converter lock-up, thereby transmitting engine power to the wheels. In contrast, a neutral state is achieved by releasing hydraulic pressure, which disconnects the engine from the drivetrain, allowing the vehicle to idle or shift gears without transferring power. In various embodiments, a neutral state in accordance with a feature as disclosed herein may selectively include an intermediate state, for example a pre-engagement or pre-fill state, wherein hydraulic pressure may be partially applied to the clutches to prepare for a rapid and smooth transition to full engagement. A Transmission Control Unit (TCU) may coordinate these transitions by continuously monitoring sensor inputs such as shaft speeds, hydraulic pressures, and gear selector positions, ensuring that each state is activated only when predetermined conditions are met.

The transport vehicle 100 may include a hydraulic pump coupled with the propulsion unit 116, the hydraulic pump receiving power from the propulsion unit 116 either directly or as transmitted through the transmission unit 118. The hydraulic pump may provide hydraulic power and control to the various control mechanisms of the transport vehicle 100 as described herein, including by example the clutch and the hydraulic actuator 108. The hydraulic pump may be communicatively coupled with a controller 220 to provide input signals and further to receive control signals related to the control of certain components of the transport vehicle 100.

As depicted in FIG. 2, a control system 200 associated with the transport vehicle 100 may include the above-referenced controller 210 for the transport vehicle 100, which may in some aspects comprise or otherwise be associated with an operator interface 232 which may include a display unit 234 mounted in the operator portion 112, as further described below. Generally speaking, the controller 210 may be functionally linked or otherwise in operable communication with the propulsion unit 216, the transmission unit 218, the dump body control unit 220, the operator interface 232 and display 234 thereof, and a plurality of sensors 212 or alternative data and input signal sources for monitoring a plurality of vehicle states and operating parameters, for further controlling a plurality of operating conditions of the transport vehicle 100.

By way of example, the controller 210 may receive signals representative of parameters of the propulsion unit 116, such as those relating to rotational speed (speed), torque, and power, and may control certain aspects of the operation of the propulsion unit 116, such as rotational speed, torque, and power. The controller 210 may communicate with the propulsion unit 116 through intermediate components, such as a propulsion control unit or vehicle control unit (VCU), and thus may control the propulsion unit 116 indirectly by sending commands to the ECU or VCU, which in turn controls the propulsion unit 116. Similarly, the controller 210 may receive signals indicative of rotational speed, gear or speed ratio, torque, and power of the transmission unit 118, and may control those aspects of the operation of the transmission unit 118, including through an intermediate component such as a transmission control unit (TCU). While the controller 210 is described above as communicating with the various units, including the vehicle control unit and the transmission control unit, the controller 210 may be integrated into a common control unit while providing substantially the same end functionality.

The controller 210 includes or may be associated with a processor 222, a computer-readable medium 224, a communication unit 226, and further data storage 228 such as for example a database network. It is understood that the controller 210 described herein may be a single controller having some or all of the described functionality, or it may include multiple controllers wherein some or all of the described functionality is distributed among multiple controllers. An onboard controller may further be linked with one or more remote computing devices 214 including for example any or all of personal computing devices, a cloud computing environment, controllers for other transport vehicles or work machines in a communication environment, or the like. In some embodiments, functions or steps as disclosed herein may be executed or otherwise influenced by the controller 210 alone, or through some combination of the controller 210 with one or more of the above-referenced remote devices 214.

Various "computer-implemented" operations, steps or algorithms as described in connection with the controller 210 can be embodied directly in hardware, in a computer program product such as a software module executed by the processor 222, or in a combination of the two. The computer program product can reside in RAM memory, flash memory, ROM memory, EPROM memory, EEPROM memory, registers, hard disk, a removable disk, or any other form of computer-readable medium known in the art. An exemplary computer-readable medium 224 can be coupled to the processor such that the processor can read information from, and write information to, the medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general purpose or specific purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The communication unit 226 may support or provide communications between the controller and external communications units, systems, or devices, and/or support or provide communication interface with respect to internal components of the transport vehicle 100. The communications unit may include wireless communication system components (e.g., via cellular modem, Wi-Fi, Bluetooth or the like) and/or may include one or more wired communications terminals such as universal serial bus ports.

The data storage 228 is further described below may, unless otherwise stated, generally encompass hardware such as volatile or non-volatile storage devices, drives, electronic memory, and optical or other storage media, as well as in certain embodiments one or more databases residing thereon.

FIG. 3 depicts a method 300 of selectively disengaging a transmission according to an aspect of the present disclosure. Various steps in the illustrative method 300 may now be described which are exemplary but not limiting on the scope of the present disclosure unless otherwise specifically noted. One of skill and the art may appreciate that alternative aspects may include fewer or additional steps, and that certain disclosed steps may for example be performed in different chronological order or substantially simultaneously. Unless otherwise specifically noted, operations, steps, functions, processes, and the like as disclosed in association with the method 300 may be executed or directed by a single computing device, or via multiple computing devices in operable communication via communications network. Exemplary such computing devices may include onboard controllers or machine control systems, remote servers, mobile user devices, and the like.

The method 300 may for example begin in step 302 with the transport vehicle being in use, for example upon initiation of a transit to or from a worksite wherein material is to be loaded in the load-transporting element of the transport vehicle, or unloaded/dumped from the load-transporting element of the transport vehicle. In step 304 as depicted, the method 300 may include receiving a number of different system input signals from various components for further determining in step 306 whether the transport vehicle is in what may be characterized for illustrative purposes as a transit state (e.g., a state wherein the feature as disclosed herein is enabled) or a work state (e.g., a state wherein the feature as disclosed herein is disabled). The various components as data or input signal sources may include but are not limited to the vehicle control unit, the transmission control unit, the sensors, the user interface, and various other sources for generating signals representative of vehicle states of the transport vehicle 100 as described herein for the purpose of determining at least a transit state or a work state associated with the transport vehicle 100.

Those of skill in the art will appreciate at least a specified subset of the various sensors described herein may sense and act at least in part to generate the input signals received during the system inputs step 304. It may be appreciated that the step 304 of receiving system inputs may include receiving and further analyzing a certain set of input signals at one instance, wherein some or all of the same signals may be received and analyzed, along with additional signals or some combination of both, at another instance as further illustrated and described below.

In some aspects, the step 306 for determining a transit state or a work state of the transport vehicle 100 may be associated with an operating condition of the transport vehicle 100 relevant for determining whether or not the transport vehicle 100 is in a suitable operating condition to enable a transmission state disengagement. Exemplary system inputs as depicted in FIG. 3 may include signals or other forms of data corresponding to a dump body position 304a, for example as directly or indirectly sensed or otherwise ascertained from sensors integrated with the hydraulic actuator of the load-transporting element, kinematic sensors, imaging devices, or the like. Further exemplary system inputs as depicted in FIG. 3 may include signals or other forms of data corresponding to dump body commands 304b, for example as directly or indirectly sensed or otherwise ascertained from sensors associated with a joystick or equivalent user interface tool for generating commands, the controller, the dump body control unit, or the like.

In some embodiments, it may be sufficient for ascertaining a transit state in step 306 to determine the dump body position based on either or both of the aforementioned inputs, or alternative inputs as further described below, but it may be appreciated that any number of such inputs may be utilized in appropriate combinations by one of skill in the art.

In either or both of the previous system inputs 304a and 304b, a detected or expected dump body tip angle (e.g., relative to the ground or to the frame) may be compared to a predetermined threshold value, such as for example five percent, above which the conditional feature as disclosed herein may be disabled and/or deactivated, and only below which the conditional feature as disclosed herein may be enabled and activated. The specific threshold may for example be predetermined via user input, or automatically determined by monitoring the actual dump body tip angle over time and identifying correlations between the actual tip angle and a corresponding transit or working operation of the transport vehicle.

In some aspects, a dump body tip angle may further be supplemented or otherwise determined in association with an associated load sensing input representative of the load arranged within the load transporting element. The load sensing input may be associated with a hydraulic control input, including an inclination position associated with the load transporting element, to estimate a load vector associated with material within the load transporting element.

In some aspects, a hydraulic control input may be associated with a predetermined protocol controlling the position of the load transporting element. In an exemplary aspect, the predetermined protocol controlling the position of the load transporting element may be provided as an auto dump command which, when enabled and executed, may initiate a set sequence of control of the load transporting element.

Another exemplary system input as depicted in FIG. 3 may include signals or other forms of data corresponding to whether the service brake has been applied (304c), for example as directly or indirectly sensed or otherwise ascertained from sensors associated with a service brake pedal and generating signals representing an amount of manual engagement thereof, signals representing equivalent commands in an autonomous system where no manual engagement of a pedal is provided by the service brake is nonetheless to be applied, or the like.

Another exemplary system input as depicted in FIG. 3 may include signals or other forms of data corresponding to whether the parking brake has been applied (304d), for example as directly or indirectly sensed or otherwise ascertained from sensors associated with a parking brake pedal and generating signals representing an amount of manual engagement thereof, signals representing equivalent commands in an autonomous system where no manual engagement of a pedal is provided by the parking brake is nonetheless to be applied, or the like.

In various embodiments, the previous inputs 304c and 304d may be analyzed in tandem, wherein for example the conditional feature as disclosed herein is only enabled and activated when the service brake is applied and the parking brake released, and is disabled and/or deactivated when the service brake is released and/or the parking brake applied.

Input signals representative of brake input may include a position associated with the relevant brake, including actuators or electronic systems associated with the brake. In an exemplary aspect, the signal representative of the brake input may originate from a brake pedal position sensor, a brake pressure sensor, or both. The brake pedal position sensor may include a linear potentiometer, a Hall-effect sensor, or other sensors suitable to determine an absolute or relative position associated with the brake. The brake pressure sensor may be provided as a piezoelectric sensor or other suitable sensor that may convert pressure changes into an electronic signal. In some aspects, the position associated with the brake input may be received and evaluated over a period of time come up providing a further signal representative of a rate associated with brake application and/or brake release. The brake input may correspond to application of a service brake or a parking brake in the operator portion 112 of the transport vehicle 100. The input signal representative of the brake input may include a position, pressure, binary input, or combination thereof associated with application of the brake.

Another exemplary system input as depicted in FIG. 3 may include signals or other forms of data corresponding to a transmission output shaft speed (304e). In an embodiment, the transmission output shaft speed may be compared to a first predetermined threshold value, such as for example being below twenty revolutions per minute, and the duration of the transmission output shaft speed being below the first predetermined threshold value may further be compared to a second predetermined threshold value, such as for example being at least ten seconds, wherein the conditional feature as disclosed herein may be disabled and/or deactivated if both of these conditions are not satisfied, and the conditional feature as disclosed herein may only be enabled and activated if both conditions are satisfied. The specific thresholds may for example be predetermined via user input, or automatically determined by monitoring the transmission output shaft speed over time and identifying correlations between the shaft speed and a corresponding transit or working operation of the transport vehicle.

Another exemplary system input as depicted in FIG. 3 may include signals or other forms of data corresponding to a transport vehicle pitch (304f). In an embodiment, the transport vehicle pitch may be compared to a predetermined threshold value, such as for example being between +5% and −5% with respect to level ground, wherein the conditional feature as disclosed herein may be disabled and/or deactivated if this condition is not satisfied, and the conditional feature as disclosed herein may only be enabled and activated if this condition is satisfied. The specific upper and lower thresholds may for example be predetermined via user input, or automatically determined by monitoring the transport vehicle pitch over time and identifying correlations between the transport vehicle pitch and a corresponding transit or working operation of the transport vehicle.

Another exemplary system input as depicted in FIG. 3 may include signals or other forms of data corresponding to a rate of release of the service brake pedal (304g). In an embodiment, the rate of release may be compared to one or more predetermined threshold values, such as for example a specified timing by which the service brake pedal goes from a first setting (e.g., x%/sec) to a second setting (e.g., 0%/sec) and/or a third setting (e.g., 10×%/sec), wherein the conditional feature as disclosed herein may be disabled and/or deactivated if this condition is not satisfied, and the conditional feature as disclosed herein may only be enabled and activated if this condition is satisfied. The specific settings may for example be predetermined via user input, or automatically determined by monitoring the rate of release over time and identifying correlations between the rate of release and a corresponding transit or working operation of the transport vehicle.

Other exemplary system inputs as depicted in FIG. 3 may include signals or other forms of data corresponding to any critical faults which may be defined for the purpose of disabling the conditional feature as disclosed herein. As one example, the system may be configured such that the transmission shifts into a neutral state (e.g., clutch cutoff on) within 0.5 seconds of receiving a corresponding command. As one alternative or complementary example, the system may be configured such that the transmission shifts into a non-neutral prefilled gear state (e.g., clutch cutoff off) within 0.25 seconds of receiving a corresponding command. In either of the previous examples, if it is determined that the defined timing is or will not be satisfied, the conditional feature as disclosed herein may be disabled until corrective action is provided and confirmed.

Still further exemplary system inputs, not shown in FIG. 3, may include perception system inputs for identifying a location of the transport vehicle, a position of the transport vehicle relative to surroundings such as for example a work site or other transport vehicles, or the like. Perception system inputs may for example be provided from perception sensors associated with the transport vehicle, such as one or more global navigation satellite system (GNSS) sensing units or an equivalent, which can detect an absolute position of the transport vehicle 100 within an external reference system and can further detect changes in such position.

Other sensors may also indicate various attributes of the transport vehicle 100 relative to an external reference system as described herein. Other perception sensors may include a camera based system, which can observe surrounding structural features via image processing and can respond to the orientation of the transport vehicle 100 relative to those surrounding structural features. Other perception sensors may include kinematic devices such as inertial measurement units (IMUs) or equivalent sensors as known in the art to measure (among other things) velocity and acceleration, angular velocity and angular acceleration, strength and direction of a magnetic field, and/or the like. Other perception sensors may include one or more of vehicle speed sensors, ultrasonic sensors, laser scanners, radar wave transmitters and receivers, thermal sensors, imaging devices, structured light sensors, and other optical sensors, wherein exemplary imaging devices may include a digital (CCD/CMOS) camera, an infrared camera, a stereoscopic camera, high resolution light detection and ranging (LiDAR) scanners, radar detectors, laser scanners, and the like within the scope of the present disclosure.

In some aspects, the input signal representative of a position of the transport vehicle 100 may be further relative to another one of the transport vehicle 100 and/or a work machine (e.g., excavator, loader) located within the work area. The position of the transport vehicle 100 relative to others of the transport vehicle 100 and/or work machine may be a factor for indicating a transit or work state of the transport vehicle 100, particularly that in close proximity to one or more of the other transport vehicle 100 and/or work machine, the vehicle may be in or expected to be in a work state.

In some aspects, the external reference system providing information to a perception system may be a work environment (e.g., work area) provided as a location-specific area in which the transport vehicle 100 may be located during a work state. The work area may be selectively defined based on locations of potential work sites wherein or in association with which work of the transport vehicle 100 may be performed (e.g., loading and unloading of the material) and may further account for the location of other transport vehicle or work machines that may come into proximity and operably interact with the transport vehicle 100.

The perception system may additionally generate signals representative of a position of the transport vehicle 100 relative to the work area and/or an advance of the transport vehicle 100 relative to the work area. The advance of the transport vehicle 100 may be representative of a change in position of the transport vehicle 100 over a period of time.

The step 306 for determining a transit state or a work state may in various embodiments rely on an analysis of some or all of the above-referenced system inputs to identify specified conditions. In some embodiments, the state may be dynamically estimated through a process which may include classifying sets of conditions provided by the input signals into defined machine operating conditions, which may for example relate to a particular type of work cycle. In some aspects, work state estimation may be treated as a classical sequence classification problem, addressed by developing learning models over time, examples of which may include but are not limited to supervised Machine Learning (ML)/Deep Learning (DL) classification algorithms like Logistic Regression and Long Short-Term Memory (LSTM) recurrent neural network models for sequence classification. The learning models may be capable of learning from representations of time series data associated with input signals received in the system input receiving step 304, effectively remembering over long sequences of input data and previous operation of the transport vehicle 100, and further trained to observe loss and accuracy values over N training iterations, wherein these time series data are classified into defined transit or work states.

The dynamic estimation step 210 may include continuous adjustments to estimating a current transit or work state of the transport vehicle 100 in view of the system input signals received during the step 304. As described above, the time-based information of the input signals received during the system input step 304 may, together with dynamically estimated transit or work states in step 306, form a vehicle state model for more accurate and real-time estimation of the transit or work state of the transport vehicle 100.

In an embodiment of the method 300 as depicted in FIG. 3, if it is determined that the transport vehicle is not in a transit state (i.e., "no" in response to the query of step 306), the transport vehicle may in step 308 be considered as being in a work state, wherein the conditional feature as disclosed herein is disabled and no further action taken, other than to return to step 304 and continue receiving and analyzing system inputs for determining when the transport vehicle has entered a transit state.

If it is determined that the transport vehicle is in a transit state (i.e., "yes" in response to the query of step 306), the method 300 may proceed to step 310, wherein system inputs are further received and analyzed for determining in step 312 whether conditions have been sufficiently satisfied to activate the conditional feature as disclosed herein. As noted above with respect to the first system inputs step 304, this second system inputs step 310 may include some or all of the exemplary system inputs 304a-304h, or even alternative system inputs entirely, as may be deemed relevant for determining whether the conditional feature should not only be enabled (e.g., the vehicle is in the transit mode and is not dumping or preparing to dump material) but further is appropriately activated under the current conditions (e.g., the service brake is engaged, among other conditions as may be defined).

If the conditional feature is not activated (i.e., "no" in response to the query of step 312), the method 300 may return to step 308 if the analysis of the system inputs results in a determination that the vehicle is in a work state and is no longer in the transit state, or may return to step 310 if the conditional feature is still deemed to be enabled, but is not yet ready to be activated.

If the conditional feature is activated (i.e., "yes" in response to the query of step 312), the method 300 may further include a step 314 of generating a transmission control signal which may enable shifting of the transmission state to a neutral state, or in other words disengagement, associated with the transmission unit 118 for reduction of engine load and corresponding fuel consumption. The transmission control signal may in some instances be generated by the vehicle control unit and transmitted via the controller area network bus to the transmission control unit.

In some aspects, the step 314 of shifting the transmission to a neutral state may further include directing the transmission control unit to effect a pre-engagement state of the transmission. In the pre-engagement state of the transmission, the transmission state may effect certain changes within the transmission that reduce the transmission time from a transmission disengaged state to a transmission engaged state for any particular transmission state desired to be engaged. In an exemplary aspect, the pre-engagement state of the transmission may be provided as a prefilled clutch state associated with the transmission of the transport vehicle, which includes directing an amount of hydraulic fluid applied to a clutch in preparation for engagement but before full torque transfer to the transmission may occur. In some aspects, an action of a pre-engagement state of the transmission may occur simultaneously with the step of executing the transmission state change or within a predetermined time threshold associated with the transmission state disengagement, including within any time tolerance determined by an operator user, administrator, or otherwise authorized control agent associated with the method 300.

The step of directing the pre-engagement state may include directing a volume of hydraulic fluid to the clutch, or other structure of the powertrain system operably connecting the engine to the transmission, as associated with the transmission state disengagement. The step of directing the volume of hydraulic fluid to the clutch may operate to facilitate subsequent transition of the transmission from the disengaged (neutral) state to the engaged (non-neutral) state. In some instances, a user operator or other authorized control agent may indicate a gear associated with a transmission engaged state to which the pre-engagement will apply, for example, indicating a forward or a reverse gear as being the pre-engagement state of the transmission. Those of skill in the art will appreciate that the clutch may be provided as any suitable type of clutch or powertrain system component to engage the engine with the transmission, including torque converters, multi-plate type clutches, and other types. The clutch and transmission may operate to engage one of any non-neutral transmission operating state (e.g., gear) by ensuring the clutch is fully engaged for that operating state. For instance, a forward gear clutch pack may not be pressurized where the transmission is in a disengaged state (e.g., neutral) and may need to be further pressurized to a threshold degree in order to shift the transmission to an engaged state in the forward gear.

The step of directing a volume of hydraulic fluid may provide a partial volume of hydraulic fluid to a portion of the clutch associated with a transmission state engagement, more particularly a forward gear associated with the transmission engaged state. In some instances, a signal for directing the volume of hydraulic fluid to the clutch may be generated by the transmission control unit or the vehicle control unit and may direct the hydraulic pump to direct the volume of fluid. The partial volume of hydraulic fluid that may be directed to the clutch may be of a volume less than an actuation volume of hydraulic fluid required to engage the clutch with the transmission engaged state corresponding to a particular gear desired for future engagement. In an exemplary aspect, the step of directing the partial volume of hydraulic fluid to the clutch directs the partial volume into a clutch pack to initiate a fluid pressure and bring clutch plates close without full engagement. This initiated fluid pressure may increase an alignment of the clutch plates to prepare the clutch plates for smooth engagement. In some aspects, the partial volume of hydraulic fluid may be tunable based on the actuation volume required to engage the clutch, such that the degree of alignment of the clutch plates may be selectively determined based on operator preferences, specific components of the powertrain system of the transport vehicle, desired time window to allow for full engagement of the clutch, or a combination thereof.

By way of example, upon transmission state disengagement, the partial volume of hydraulic fluid may be directed to prime a forward or a reverse gear of the transmission state engagement (e.g., non-neutral transmission state). Where the forward gear is chosen for priming, the partial volume of hydraulic fluid may be directed to a portion of the clutch corresponding to the forward gear. The step of directing the partial volume of fluid may in some aspects occur near-simultaneously with the transmission state disengagement and subsequent to the transmission state disengagement. In other aspects, the timing of the step of directing the partial volume of fluid relative to the steps of conditionally generating the transmission state control signal, enabling the transmission state disengagement, executing the transmission state disengagement, or a combination thereof may be tailored according to a desired transition time between the transmission disengagement state to the transmission engagement state.

Having activated the conditional feature as disclosed herein in step 314, wherein the transmission state has been shifted to neutral, and optionally having the relevant clutch prefilled for a more rapid transition to the non-neutral state, the method 300 may continue in step 316 with further monitoring of system inputs (e.g., one or more of system inputs 304*a*-304*h*) to determine in step 318 when the conditional feature is to be deactivated. When such a determination is made, deactivation of the conditional feature may include a distinct step 320 of engaging the transmission to provide the transmission operating in a transmission state engagement. In some aspects, the step of disabling the transmission state disengagement may be collapsed into a same step of engaging the transmission. The step of engaging the transmission may in some instances be associated with a re-engaging of the transmission subsequent to a step of executing the conditional feature deactivation.

Upon deactivation of the conditional feature and re-engaging of the non-neutral transmission state, the method 300 may return to step 308 if the analysis of the system inputs results in a determination that the vehicle is in a work state and is no longer in the transit state, or may return to step 310 if the conditional feature is still deemed to be enabled, and merely needs to be monitored for reactivation.

Though the method 300 is described herein with respect to a particular sequence of steps, it is understood that the steps may be performed and executed in any order, including concurrently with one or more other steps, without departing from the scope of the invention.

Conditional language used herein, such as, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or aspect may be combined with any of the other disclosed features or aspects.

What is claimed is:

1. A computer-implemented method of automatically and conditionally implementing a transmission state control feature for a transport vehicle comprising a transmission unit, a service brake, a load-transporting element, and a controller, the method comprising:

automatically ascertaining, via the controller, a transit state or a working state of the transport vehicle based on input signals from one or more vehicle sensors and corresponding to a first set of one or more operating parameters, wherein conditions for each of the one or more operating parameters in the first set are determined relative to specified values and/or thresholds, wherein the transit state is determined in association with each respective condition being satisfied for each of the one or more operating parameters in the first set, wherein at least one of the first set of one or more operating parameters is associated with a position of the load-transporting element, and wherein the transmission state control feature is disabled in an ascertained working state;

further determining, via the controller and upon ascertaining the transit state, conditions for each of a second set of one or more operating parameters relative to specified values and/or thresholds, wherein the transmission state control feature is activated upon each respective condition being satisfied for each of the one or more operating parameters in the second set, wherein at least one of the second set of one or more operating parameters is associated with application of the service brake;

upon activation of the transmission state control feature, automatically generating an output signal for commanding the transmission unit to a neutral state, wherein an associated clutch is disengaged and further comprising an amount of hydraulic fluid pumped thereto and defining a prefilled state;

upon further determining that each respective condition is no longer satisfied for each of the one or more operating parameters in the second set, automatically generating an output signal for commanding the transmission unit to a non-neutral state.

2. The computer-implemented method of claim 1, wherein application of the service brake is determined based on a threshold level of engagement of the service brake.

3. The computer-implemented method of claim 1, wherein application of the service brake is determined based on detected commands for application of the service brake.

4. The computer-implemented method of claim 1, wherein the at least one of the first set of one or more operating parameters associated with the position of the load-transporting element comprises a determined tilt angle of the load-transporting element relative to a frame of the transport vehicle, wherein for activation of the transmission state control feature a condition must be satisfied based on the tilt angle being determined as below a corresponding threshold value.

5. The computer-implemented method of claim 1, wherein the at least one of the first set of one or more operating parameters associated with the position of the load-transporting element comprises a detected command for raising the load-transporting element relative to a frame of the transport vehicle, wherein for activation of the transmission state control feature a condition must be satisfied based on no commands being provided for raising of the load-transporting element.

6. The computer-implemented method of claim 1, comprising receiving signals corresponding to an output shaft speed associated with the transmission unit, as one of the first and/or second sets of one or more operating parameters, wherein for activation of the transmission state control feature a condition must be satisfied based on a first threshold for the output shaft speed and further based on a second threshold for a duration of time being below the output shaft speed.

7. The computer-implemented method of claim 1, comprising receiving signals corresponding to a parking brake associated with the transport vehicle, as one of the first and/or second sets of one or more operating parameters, wherein for activation of the transmission state control feature a condition must be satisfied based on the parking brake being disengaged.

8. The computer-implemented method of claim 1, comprising receiving signals corresponding to a pitch of the transport vehicle, as one of the first and/or second sets of one or more operating parameters, wherein for activation of the transmission state control feature a condition must be satisfied based on the pitch being determined as below a corresponding threshold value.

9. The computer-implemented method of claim 1, comprising receiving signals corresponding to a rate of release for a pedal associated with the service brake, as one of the first and/or second sets of one or more operating parameters, wherein for activation of the transmission state control feature a condition must be satisfied based on the rate of release being determined as below a corresponding threshold value.

10. The computer-implemented method of claim 1, comprising receiving signals corresponding to an execution time for disengagement of the associated clutch pursuant to commanding of the transmission unit to the neutral state, as one of the first and/or second sets of one or more operating parameters, wherein for activation of the transmission state control feature a condition must be satisfied based on the execution time being determined as below a corresponding threshold value.

11. The computer-implemented method of claim 1, comprising receiving signals corresponding to an execution time for engagement of the associated clutch pursuant to commanding of the transmission unit from the neutral state to the non-neutral state, wherein for subsequent activation of the transmission state control feature a condition must be satisfied based on an expected execution time for engagement of the associated clutch being determined as below a corresponding threshold value.

12. A transport vehicle comprising:

a transmission unit;

a service brake;

a load-transporting element;

one or more vehicle sensors configured to generate output signals corresponding to one or more operating parameters; and a controller configured to:

automatically ascertain a transit state or a working state of the transport vehicle based on input signals from the one or more vehicle sensors and corresponding to a first set of one or more operating parameters, wherein conditions for each of the one or more operating parameters in the first set are determined relative to specified values and/or thresholds, wherein the transit state is determined in association with each respective condition being satisfied for each of the one or more operating parameters in the first set, wherein at least one of the first set of one or more operating parameters is associated with a position of the load-transporting element, and wherein a transmission state control feature is disabled in an ascertained working state;

further determine, upon ascertaining the transit state, conditions for each of a second set of one or more operating parameters relative to specified values and/or thresholds, wherein the transmission state control feature is activated upon each respective condition being satisfied for each of the one or more operating parameters in the second set, wherein at least one of the second set of one or more operating parameters is associated with application of the service brake;

upon activation of the transmission state control feature, automatically generate an output signal for commanding the transmission unit to a neutral state, wherein an associated clutch is disengaged and further comprising an amount of hydraulic fluid pumped thereto and defining a prefilled state; and upon further determining that each respective condition is no longer satisfied for each of the one or more operating parameters in the second set, automatically generate an output signal for commanding the transmission unit to a non-neutral state.

13. The transport vehicle of claim 12, wherein application of the service brake is determined based on a threshold level of engagement of the service brake.

14. The transport vehicle of claim 12, wherein application of the service brake is determined based on detected commands for application of the service brake.

15. The transport vehicle of claim 12, wherein the at least one of the first set of one or more operating parameters associated with the position of the load-transporting element comprises a determined tilt angle of the load-transporting element relative to a frame of the transport vehicle, wherein for activation of the transmission state control feature a condition must be satisfied based on the tilt angle being determined as below a corresponding threshold value.

16. The transport vehicle of claim 12, wherein the at least one of the first set of one or more operating parameters associated with the position of the load-transporting element comprises a detected command for raising the load-transporting element relative to a frame of the transport vehicle, wherein for activation of the transmission state control feature a condition must be satisfied based on no commands being provided for raising of the load-transporting element.

17. The transport vehicle of claim 12, wherein the controller is configured to receive signals corresponding to an output shaft speed associated with the transmission unit, as one of the first and/or second sets of one or more operating parameters, wherein for activation of the transmission state control feature a condition must be satisfied based on a first threshold for the output shaft speed and further based on a second threshold for a duration of time being below the output shaft speed.

18. The transport vehicle of claim 12, wherein the controller is configured to receive signals corresponding to a parking brake associated with the transport vehicle, as one of the first and/or second sets of one or more operating parameters, wherein for activation of the transmission state control feature a condition must be satisfied based on the parking brake being disengaged.

19. The transport vehicle of claim 12, wherein the controller is configured to receive signals corresponding to a pitch of the transport vehicle, as one of the first and/or second sets of one or more operating parameters, wherein for activation of the transmission state control feature a condition must be satisfied based on the pitch being determined as below a corresponding threshold value.

20. The transport vehicle of claim 12, wherein the controller is configured to receive signals corresponding to a rate of release for a pedal associated with the service brake, as one of the first and/or second sets of one or more operating parameters, wherein for activation of the transmission state control feature a condition must be satisfied based on the rate of release being determined as below a corresponding threshold value.

* * * * *